United States Patent [19]
Valentine et al.

[11] Patent Number: 5,838,941
[45] Date of Patent: Nov. 17, 1998

[54] OUT-OF-ORDER SUPERSCALAR MICROPROCESSOR WITH A RENAMING DEVICE THAT MAPS INSTRUCTIONS FROM MEMORY TO REGISTERS

[75] Inventors: Robert C. Valentine, Qiryat Tivon; Gad S. Sheaffer, Haifa; Ronny Ronen, Haifa; Ilan Spillinger, Haifa; Adi Yoaz, Haifa, all of Israel

[73] Assignee: Intel Corporation, Santa Clara, Calif.

[21] Appl. No.: 774,659

[22] Filed: Dec. 30, 1996

[51] Int. Cl.⁶ .............................. G06F 9/00; G06F 9/318
[52] U.S. Cl. .................. 395/393; 395/392; 395/564; 395/567; 395/570; 395/800.23
[58] Field of Search ................... 395/390–394, 395/800.23, 380, 385, 561, 564, 567–568, 570

[56] References Cited

U.S. PATENT DOCUMENTS

| | | | |
|---|---|---|---|
| 4,901,233 | 2/1990 | Liptay | 395/394 |
| 4,992,938 | 2/1991 | Cocke et al. | 395/393 |
| 5,197,132 | 3/1993 | Steely, Jr. et al. | 395/393 |
| 5,371,684 | 12/1994 | Iadonato et al. | 364/491 |
| 5,465,373 | 11/1995 | Kahle et al. | 395/391 |
| 5,467,473 | 11/1995 | Kahle et al. | 395/800.23 |
| 5,471,633 | 11/1995 | Colwell et al. | 395/800.23 |
| 5,497,493 | 3/1996 | Colwell et al. | 395/800.23 |
| 5,497,499 | 3/1996 | Garg et al. | 395/393 |
| 5,517,651 | 5/1996 | Huck et al. | 395/570 |
| 5,524,262 | 6/1996 | Colwell et al. | 395/800.23 |
| 5,539,911 | 7/1996 | Nguyen et al. | 395/800.23 |
| 5,546,597 | 8/1996 | Martell et al. | 395/800.23 |
| 5,546,599 | 8/1996 | Song | 395/393 |
| 5,548,776 | 8/1996 | Colwell et al. | 395/393 |
| 5,553,256 | 9/1996 | Fetterman et al. | 395/393 |
| 5,560,032 | 9/1996 | Nguyen et al. | 395/800.23 |
| 5,564,056 | 10/1996 | Fetterman et al. | 395/800.23 |
| 5,613,132 | 3/1997 | Clift et al. | 395/393 |
| 5,630,149 | 5/1997 | Bluhm | 395/393 |
| 5,634,026 | 5/1997 | Heaslip et al. | 395/393 |
| 5,634,118 | 5/1997 | Blomgren | 395/567 |
| 5,652,774 | 7/1997 | Eickemeyer et al. | 395/393 |
| 5,758,141 | 5/1998 | Kahle et al. | 395/570 |

OTHER PUBLICATIONS

Johnson, Mike "Superscalar Microprocessor Design", Prentice Hall Series in Innovative Technology, §§ 3.4.3, 6.1.1, 6.1.2, 6.1.6, 11.3.4, pp. 48–50, 107–112, 116–119, 227–229, (1991).

Moudgill, M. and Pingali, K., "Register Renaming and Dynamic Speculation: an Alternative Approach", IEEE, pp. 202–213, (1993).

*Primary Examiner*—Parshotam S. Lall
*Assistant Examiner*—Bharat Barot
*Attorney, Agent, or Firm*—Blakely, Sokoloff, Taylor & Zafman

[57] ABSTRACT

An advanced register renamer comprises an associative memory having a plurality of entries, each entry storing a representation of a single operation as an expression paired with a corresponding name. The expression and the name are respectively stored in first and second fields of an entry in the memory. Both fields are available for subsequent assembly level operations to use as pattern matches. A means for converting a subsequent operation in the stream to a new operation searches for a match between an expression of the subsequent operation and the first field of a matching entry. Upon finding a match with the expression field in the table, the subsequent operation is renamed to a new operation by replacing the expression with the corresponding name field of the matching entry taken from the associative memory.

16 Claims, 5 Drawing Sheets

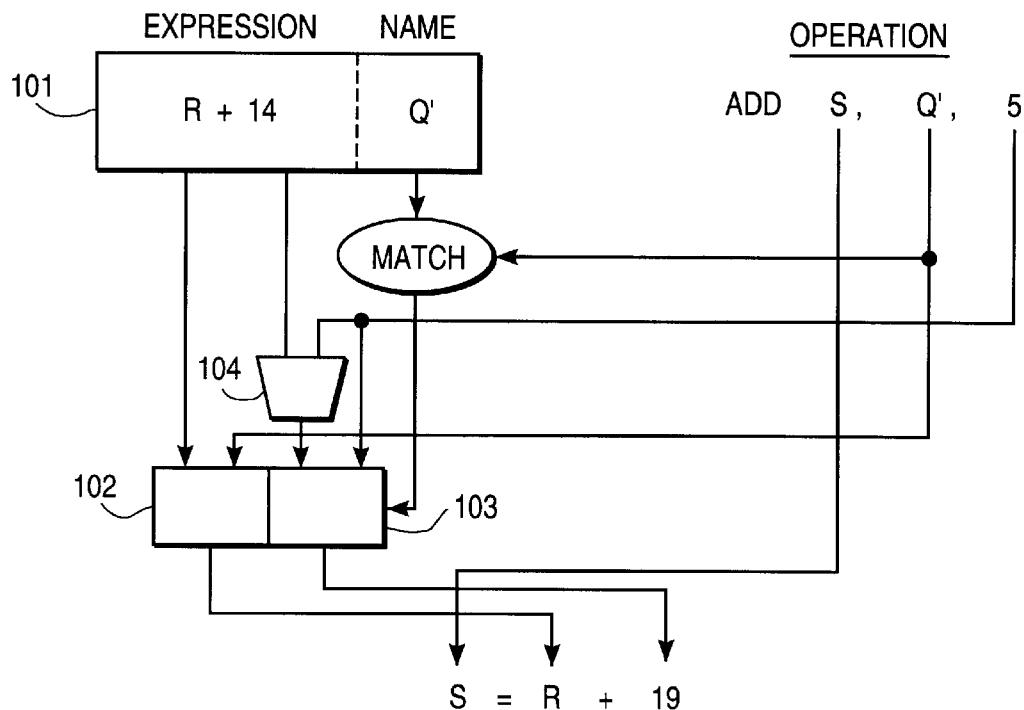
FIG_1
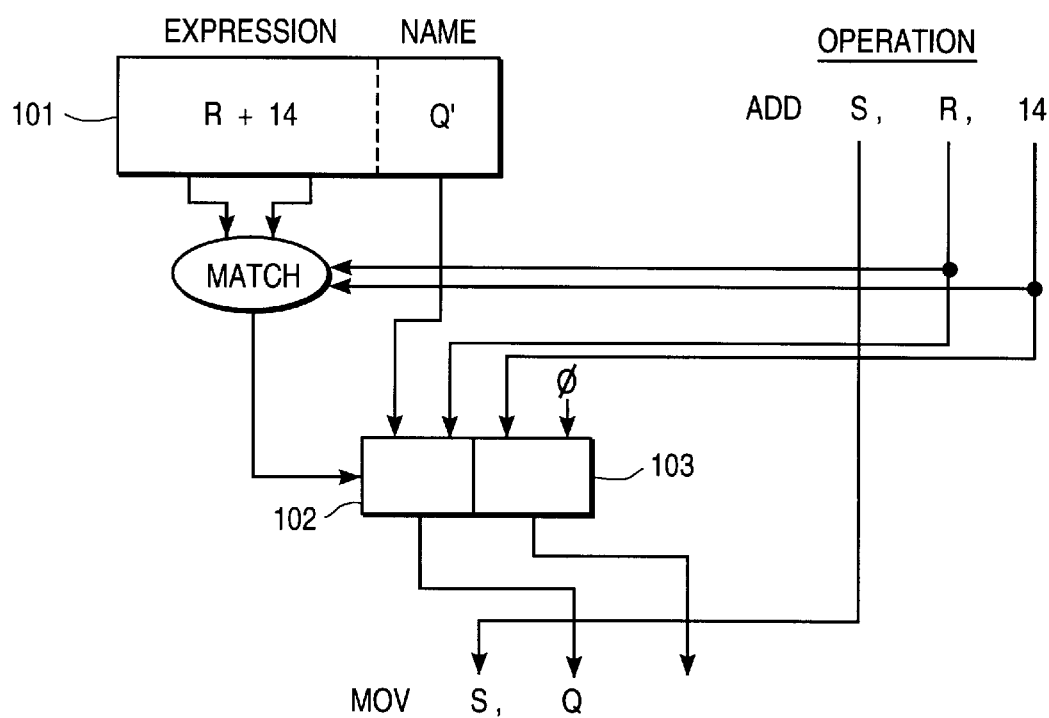
FIG_2

(1) STORE   S, R
(2) ADD     S', S, 4
⋮   ⋮
(7) LOAD    R', [S' − 4]
FIG_3
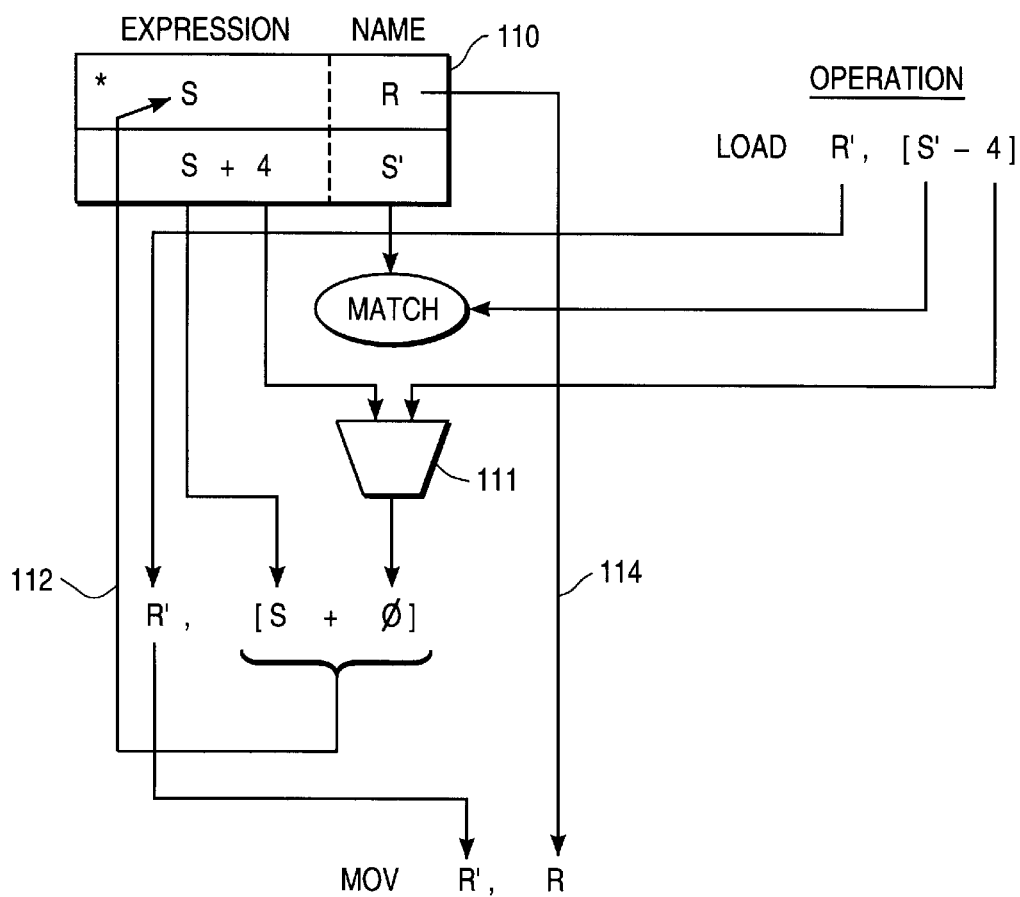
FIG_4

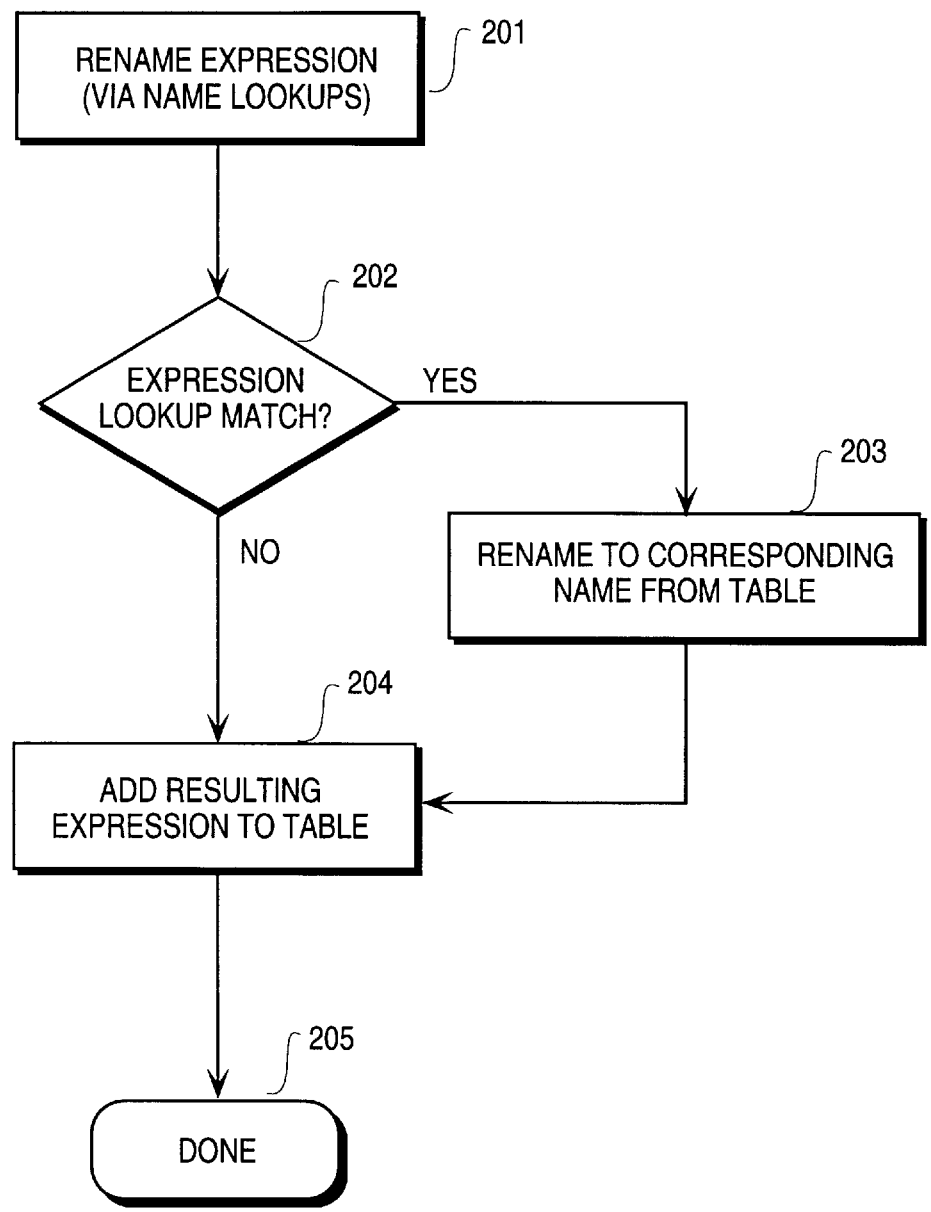
FIG_5

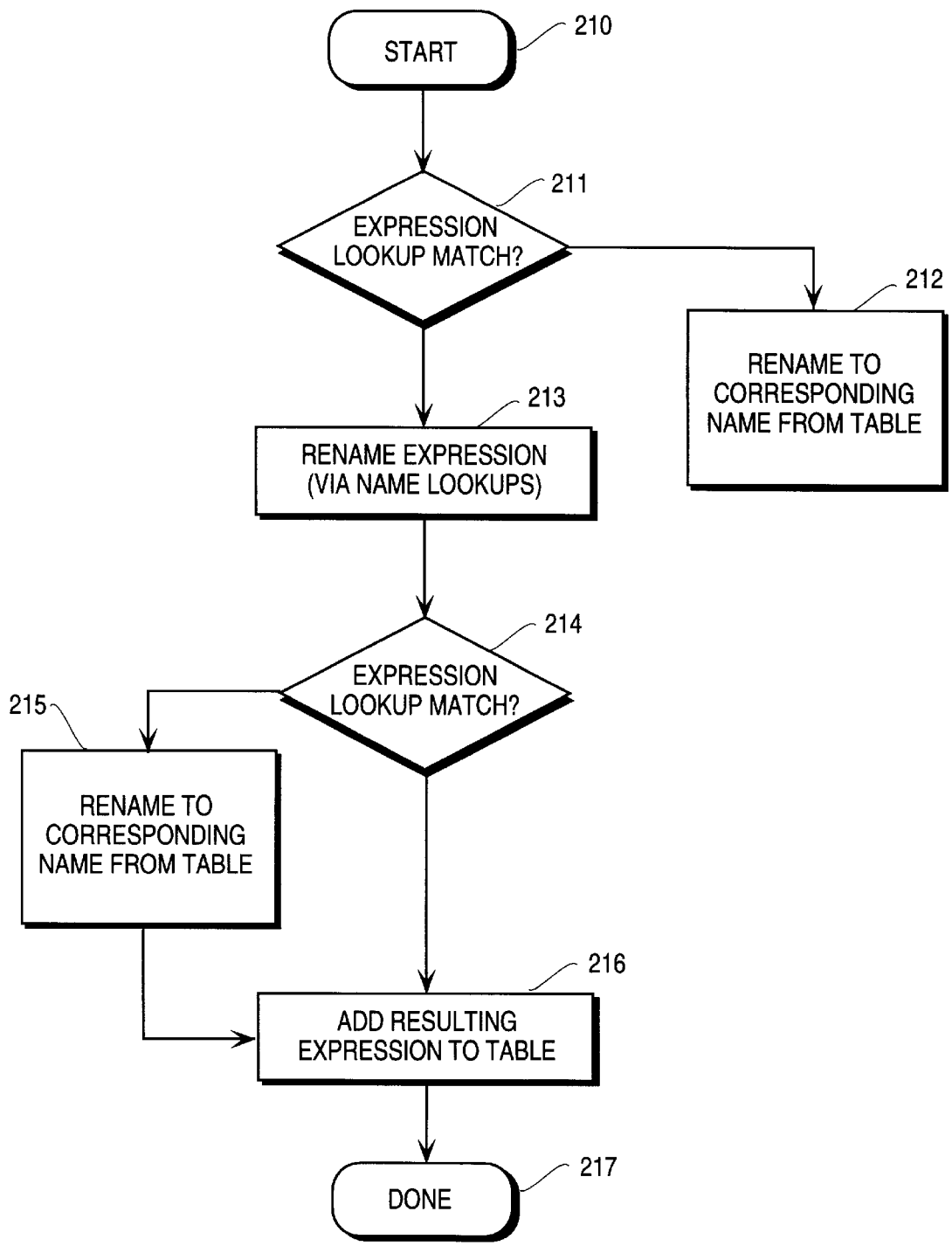
FIG_6

FIG_7

OUT-OF-ORDER SUPERSCALAR MICROPROCESSOR WITH A RENAMING DEVICE THAT MAPS INSTRUCTIONS FROM MEMORY TO REGISTERS

FIELD OF THE INVENTION

The invention relates generally to the field of computers and microprocessor architecture. More specifically, the invention relates to techniques for improving instruction level parallelism in processors that implement out-or-order execution of instructions.

BACKGROUND OF THE INVENTION

Advances in microprocessor architecture have recently lead to the introduction of out-of-order, superscalar microprocessors that are capable of processing multiple instructions in parallel while executing individual operations irrespective of the original macro instruction programming order. Quite often, these modern microprocessors utilize a device known as a renamer for the purpose of eliminating dependencies in the code that inhibit parallelism. Increased parallelism allows an out-of-order, superscalar machine to achieve maximum performance.

The technique of register renaming utilizing a renamer device is well-known in the prior art. For example, U.S. Pat. No. 4,901,233 discloses a register renaming system in which there are more physical registers than register names. This system identifies particular physical registers to perform as architected addressable or general purpose registers. Similarly, U.S. Pat. No. 4,992,938 teaches register renaming in which architected floating point registers are mapped to a greater number of physical floating point registers to remove output dependencies in instruction flow. Register renaming in a system that includes a back-up map of the physical names of logical registers at a back-up point in a computer pipeline operation is described in U.S. Pat. No. 5,197,132.

Register renaming can be performed at various stages of the instruction stream flow. By way of example, the paper entitled, "Register Renaming and Dynamics Speculation: An Alternative Approach", IEEE (1993) discusses how renaming can be performed in the decode stage of program execution, or during the instruction fetch stage.

Wherever it is performed, the goal of register renaming remains the same; namely, to improve processor performance in the execution of code by removing dependencies that inhibit parallelism. However, microprocessors that utilize register renaming or similar techniques to eliminate output and anti-dependencies still suffer from true dependencies in the code stream. In many cases, even these true dependencies are not inherent in the original algorithm, but are due to the limited visibility of some of the register contents within the compilers' scheduling window, or artifacts of the underlying instruction set architecture. Thus, there exists a need for an improved register renaming system to further increase instruction level parallelism.

As will be seen, the present invention is a hardware mechanism implemented in a microprocessor that operates on a renamed operation stream, such as would be flowing between the renamer and the reservation queues in an out-of-order, superscalar microprocessor. The invention utilizes techniques such as constant folding and common sub-expression elimination to map instructions that utilize expensive resources (i.e., memory) to less expensive resources (i.e., registers).

SUMMARY OF THE INVENTION

The present invention covers an advanced register renaming algorithm for increased instruction level parallelism and improved resource allocation. The invention operates on a renamed operation stream, such as would be flowing between the renamer and the reservation queues in an out-of-order, superscalar microprocessor.

In one embodiment, the invention comprises an associative memory having a plurality of entries, each entry storing a representation of a single operation as an expression paired with a corresponding name. The expression and the name are respectively stored in first and second fields of an entry in the memory. Both fields are available for subsequent assembly level operations to use as pattern matches.

The invention further includes a means for converting a subsequent operation in the stream to a new operation by searching for a match between an expression of the subsequent operation and the first field of a matching entry. Upon finding a match with the expression field in the table, the subsequent operation is renamed to a new operation by replacing the expression with the corresponding name field of the matching entry taken from the associative memory.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 1 is an example illustrating the technique of constant folding in accordance with one embodiment of the present invention.

FIG. 2 is an example illustrating an implementation of common sub-expression elimination in accordance with the present invention.

FIG. 3 is an example code sequence that may be found in ordinary register stack operations.

FIG. 4 illustrates memory disambiguation in conjunction with the code sequence of FIG. 3 according to the present invention.

FIG. 5 is a flow chart showing steps performed in accordance with one embodiment of the advanced register renaming system of the present invention.

FIG. 6 is a flow chart showing steps performed in accordance with another embodiment of the advanced register renaming system of the present invention.

FIG. 7 illustrates the entries of the table memory following advanced renaming according to the examples shown in FIGS. 3 and 4.

DETAILED DESCRIPTION

An advanced register renaming algorithm implemented in a microprocessor is presented. The proposed algorithm is implemented in a hardware renaming device such that when address expressions are renamed through the device, portions of memory are disambiguated. Thus, the microprocessor renaming device may be utilized to replace a LOAD instruction, on-the-fly with the symbolic contents of the corresponding memory location. Effectively, the invention converts the LOAD operation into a register MOVE operation to improve the computer system's performance.

The invention operates on a renamed operation stream, such as that which flows between a renamer and the reservation queues in an ordinary out-of-order, superscalar microprocessor. To understand the basic concept of the present invention, the following describes a single operation flowing through the renaming device in such a microprocessor. It should be understood, however, that the present invention may also be extended using known techniques to work on multiple operations.

Referring to FIG. 1, there is shown an example illustrating the basic principle of one aspect of a hardware implementation of the present invention. A memory 101 of the renaming device contains a single entry consisting of a canonical representation of an operation shown as an "expression" paired with a current "name" given to the expression. By way of example, memory 101 may comprise a bi-directional associative memory (BAM), or some other table memory having a similar structure. Various mechanisms for indexing memory 101 are known in the microprocessor arts. The name field, for instance, could receive a simpler, more traditional indexing as long as the names are kept unique.

As can be seen, the entry in memory 101 is divided into first and second fields. The first field holds the expression and the second field contains the name associated with the expression. In the example of FIG. 1, the first and second fields of the entry in memory 101 may have been allocated in the renaming device from the assembly language operation:

$$\text{add} Q', R, 14$$

For a left-oriented syntax, the above operation is equivalent to the mathematical equation:

$$Q'=R+14$$

According to the invention, both fields of memory 101 are available for subsequent operations to use as pattern matches against their own expression or against components of their expression. For instance, a subsequent operation, upon finding a match with the expression field in memory 101, can rename its own expression to the corresponding name field provided from the table. By way of example, this case is illustrated in FIG. 2 where a subsequent operation $$\text{add} S, R, 14$$

is renamed to a register-to-register MOVE operation utilizing the contents of the entry in memory 101. The renaming operation moves the contents of register Q' into register S, as shown by the resultant statement $$\text{mov } S, Q'$$

FIG. 2 also illustrates the hardware implementation for this example of common sub-expression elimination. In renaming the ADD operation (i.e., add S, R, 14) the renamer attempts to match the expression (R+14) to an entry in the expression field of memory 101. Note that in FIG. 2, a match is indicated by an ellipse that receives its inputs the corresponding expression elements. There are numerous known devices for implementing a match condition circuit. These include EXCLUSIVE-OR gates, comparators, and similar logic devices. The match condition is utilized as a select line which controls multiplexors 102 and 103. These multiplexors implement renaming by eliminating common sub-expressions found in subsequent operations. In this case, the common sub-expression is replaced by a register name to convert the ADD operation into a MOVE, thereby enhancing instruction level parallelism.

The bi-directional nature of memory 101 is evident by considering together the examples of FIGS. 1 and 2. In the example of FIG. 2, expressions are matched to enhance instruction level parallelism. As the subsequent operation passes through the renamer device, expression matching finds nothing. That is, the expression (Q'+5) of the subsequent ADD operation is not contained in the expression field of table memory 101. However, the bidirectional nature of memory 101 allows the renamer device to search for the components of the expression; i.e., attempting to match those components with a name field in the memory. In the event such a match is found, a new expression is created.

In FIG. 1, a match exists between the component Q' of the subsequent operation and the name field of the entry shown in memory 101. This match condition is used as a select line input to multiplexors 102 and 103. An adder 104 is utilized to fold the constants for the expression corresponding to the matching name. The outputs of the multiplexors therefore deliver the new, simplified expression $$S=R+19$$

The advantage of renaming operations utilizing the technique of constant folding in a hardware implementation is that the serial nature of the two expressions is broken. This means that they can execute in parallel and in any order within the microprocessor. Hence, instructional level parallelism is again enhanced.

Now assume that a series of stack operations are being performed within a microprocessor. By way of example, FIG. 3 illustrates an operation stream beginning with a memory STORE operation to the location S pointed to by register R. This is followed by an ADD operation (S+4) with the result being placed in register S'. A subsequent LOAD operation (operation #7) is later specified. FIG. 4 shows table memory 110 containing two entries corresponding to the STORE and ADD operations. (Note that the "*" shown in the first entry of table memory 110 in FIG. 4 indicates that the operation is a pointer to memory).

In this example, it is clear that S' is dependent upon register S, and there is no direct connection between the STORE and LOAD operations. In other words, neither the expression contained in operation #7 nor the name of any component in operation #7 matches any expression or name associated with operation #1. Similarly, there is no match between the expression of the LOAD operation and the ADD expression contained in the second entry of table memory 110.

There is, however, a match between the component and the expression of the LOAD operation and the name field of the second entry in table memory 110. The renamer of the present invention functions to identify this match so as to rename the components of the expression using the expression corresponding to the name found in the second entry of table memory 110. An adder 111 is again utilized to fold the constants of the expression. In this case, an access to memory 110 results in renaming the expression $$[S+4-4]=[S+0]$$

Practitioners familiar with the computer arts will recognize that the above renaming step has increased the instructional level parallelism by breaking the dependency of the LOAD operation on register S', thereby allowing it to be executed in parallel. With the newly renamed expression in hand, the renaming device of the present invention can repeat the table memory look-up in an iterative manner. For instance, during a second access to memory 110 the LOAD receives an exact expression match to the first entry in the table, as indicated by arrow 112. The exact expression match allows the load operation to be renamed to a register MOVE operation movR', R The end result is the conversion of a memory LOAD to a less costly register LOAD (i.e., MOVE).

To paraphrase, the contents of the memory location has been disambiguated so as to break the dependency of the LOAD on the STORE. Now the LOAD may execute when the data for that memory location is available and valid, regardless whether the memory has been written, or whether the address has been calculated yet. This is because the LOAD is no longer dependent on S'—now it is only dependent on R.

FIG. 7 shows the contents of table 110 after the LOAD operation passes the advanced renamer of the present invention. It is further appreciated that additional optimizations such as a MOVE-MOVE elimination could easily be implemented at this point. The present invention functions to effectively remove the costly memory LOAD from the outgoing instruction stream utilizing the algorithm described above.

It is worth noting that the renaming algorithm is not required to find all of the opportunities for optimizing the code, or for increasing instruction level parallelism, in order for the microprocessor to function. Nor is it required that this type of advanced renaming be performed on the full register set of the microprocessor. This means that a limited amount of hardware may be employed to perform advanced renaming on a subset of the full register set while still providing improved performance.

Furthermore, because the advanced renaming algorithm is iterative in nature, those of ordinary skill in the art could arrive at a pipelined implementation in a straightforward manner. In such an implementation the iterations may be spread across multiple cycles, in different waves of operation, or in different iterations simultaneously. In such embodiments, the steady-state throughput of the advanced renamer would be similar to that of a single iteration for the examples presented in FIGS. 1 or 2.

FIG. 5 is a flow chart illustrating one embodiment of the advanced renaming algorithm utilized in the processor of the present invention. When an operation passes by the renaming device, the first activity shown is the renaming of the expression of the operation. This is achieved by iteratively performing "name" look-ups in the renamer's associative memory. This is shown occurring at block 201 in FIG. 5. Matching names are replaced with the corresponding expression found in the memory, thereby resulting in a renamed expression.

Next, an "expression" look-up is performed to determine if the resulting expression can be replaced with a "name". This step involves looking for expression matches in the memory, and is represented in FIG. 5 by block 202. An expression match results in renaming the operation with the corresponding name from the table memory—the name replacing the expression in the new operation. This step is shown in FIG. 5 by step 203.

In other words, a match between the new expression and an entry of the memory causes the matching expression to be replaced by the name obtained from the corresponding entry in the table memory. Finally, any new or resulting expression is added to the table memory so that it can be used in the above-described renaming algorithm for a subsequent operation (block 204). The end result is that a costly memory LOAD operation is converted to a relatively inexpensive register MOVE.

FIG. 6 illustrates another version of the advanced renaming algorithm which includes an additional half iteration. In the embodiment of FIG. 6, an expression lookup is initially performed to identify matching expressions, as shown by block 211. If a match is found, the "expression" is renamed with the corresponding "name" from the table memory. This step is represented by block 212.

In the event that an expression look-up match is not found, the expression may be renamed via iterative "name" look-ups to the table memory (block 213). Following step 213, another expression look-up match can be performed in an attempt to rename the current expression with a corresponding name from the table. This step is shown occurring at block 214. Once again, a match causes the expression to be renamed using the corresponding name obtained from the memory, as represented by block 215. As before, the final step in the algorithm is to add the resulting expression to the table memory in order to make it available for renaming of subsequent operations (block 216).

At this point it should be appreciated that the step of renaming the expression is a move backward in the dependency chain; it performs memory disambiguation when the expression is from a STORE. The "expression" match to a "name" performs memory renaming.

Although the foregoing description contemplates the use of a bi-directional associative memory (BAM) for implementation of the table memory, practitioners will understand that a BAM implementation is not a necessity. For example, in certain cases it may be simpler to have the "name" fields unique. In such cases, since the "names" are just physical register numbers, the associative look-up on the "name" field could be replaced with a direct look-up. In situations where there are more "names" than memory locations, a set-associative look-up could also be used.

Multiple hits to the table memory may be resolved in a variety of ways; however, hits to memory values (STORE expressions) should receive the most recent copy in accordance with the disclosed embodiments. This means that memory expressions should be unique, and a STORE should invalidate and/or replace an entry to the same address syllable when it is inserted into the table memory. The use of unique names and/or expressions also provides for simpler indexing and invalidation by over-write.

Given the above, resolving hits to multiple non-memory locations (not unique) may be handled in a similar manner, or through any convenient mechanism.

We claim:

1. An out-of-order, superscalar microprocessor having a renaming device that operates on an operation stream, the renaming device comprising:

a table memory having a plurality of entries, each entry storing a representation of a single operation as an expression paired with a current name, the expression and the current name being stored in respective first and second fields; and means for converting a subsequent operation in the operation stream to a new operation by searching the table memory for a match between an expression of the subsequent operation and the first field of a matching entry, in the new operation the expression of the subsequent operation being replaced by a current name stored in the second field of the matching entry.

2. The microprocessor of claim 1 wherein the table memory comprises a bi-directional associative memory.

3. The microprocessor of claim 1 wherein the current name represents a register.

4. The microprocessor of claim 3 wherein the expression represents a memory pointer.

5. The microprocessor of claim 2 wherein the subsequent operation is a memory LOAD operation.

6. The microprocessor of claim 5 or the new operation is a register MOVE operation.

7. An out-of-order, superscalar microprocessor having a renaming device that operates on an operation stream, the renaming device comprising:

a table memory having a plurality of entries, each entry storing a single operation as an expression paired with the current name, the expression and the current name being stored in respective first and second fields; and means for converting a subsequent operation in the operation stream to a new operation by searching the table memory for a match between a name of the subsequent operation and the second field of a matching entry, in the new operation the name of the subsequent operation being replaced by the expression stored in the first field of the matching entry.

8. The microprocessor of claim 7 wherein the table memory comprises a bi-directional associative memory.

9. The microprocessor of claim 7 wherein the current name represents a register.

10. The microprocessor of claim 9 wherein the expression represents a memory pointer.

11. The microprocessor of claim 8 wherein the subsequent operation is a memory LOAD operation.

12. The microprocessor of claim 5 or the new operation is a register MOVE operation.

13. A data processing system which includes a processor coupled to a memory system, the processor having a renamer that operates on an operation stream, the renamer comprising:

a bi-directional associative memory (BAM) having at least a first entry and a second entry, the first and second entries storing representations of first and second operations, respectively, each representation being stored as an expression that points to a location in the memory system and a name that is a register which holds the contents of the location;

renaming logic that iteratively accesses the BAM to convert a memory LOAD operation into a register-to-register move operation, a first access matching a component of an expression of the memory LOAD operation with the name of the second operation stored in the second entry of the BAM, the expression of the memory LOAD operation being renamed using the expression of the second operation, a second access matching the renamed expression of the memory load operation with the expression of the first operation such that the renamed expression is renamed with the name of the first operation.

14. The data processing system of claim 13 wherein the first operation is a STORE operation.

15. The data processing system of claim 14 wherein the second operation is an ADD operation.

16. The data processing system of claim 15 wherein the operation stream includes a plurality of operations interposed between the second and third operation.

* * * * *